United States Patent [19]

Herzl

[11] 4,083,240
[45] Apr. 11, 1978

[54] BALANCED SENSING SYSTEM FOR VORTEX-TYPE FLOWMETER

[75] Inventor: Peter J. Herzl, Morrisville, Pa.

[73] Assignee: Fischer & Porter Co., Warminster, Pa.

[21] Appl. No.: 759,096

[22] Filed: Jan. 13, 1977

[51] Int. Cl.² ............................................. G01F 1/32
[52] U.S. Cl. ............................................... 73/194 VS
[58] Field of Search .................................... 73/194 VS

[56] References Cited

U.S. PATENT DOCUMENTS

| 3,946,608 | 3/1976 | Herzl | 73/194 |
| 4,003,251 | 1/1977 | Herzl | 73/194 |

*Primary Examiner*—Herbert Goldstein

[57] ABSTRACT

An acceleration-proof vortex-type flowmeter in which fluid to be measured is conducted through a flow tube having an obstacle assembly mounted therein capable of generating periodic vortices, causing a deflectable tail section of the assembly to vibrate at a corresponding rate. The vibrations are externally sensed to produce an output signal whose frequency is proportional to the fluid flow rate. The tail section is cantilevered by a flexible beam from a fixed section mounted across the flow tube, the vibrations of the tail section being transmitted to an external coupling head by a rod extending though the beam and connected at an immediate junction of a bar disposed within a longitudinal bore in the fixed section. The upper end of the bar is pivotally supported by a diaphragm covering the bore and is linked to the coupling head which is engageable by a force sensor. The distribution of mass in the bar is such as to define below the intermediate junction a balancing mass acting to render the sensing system substantially insensitive to acceleration forces.

4 Claims, 4 Drawing Figures

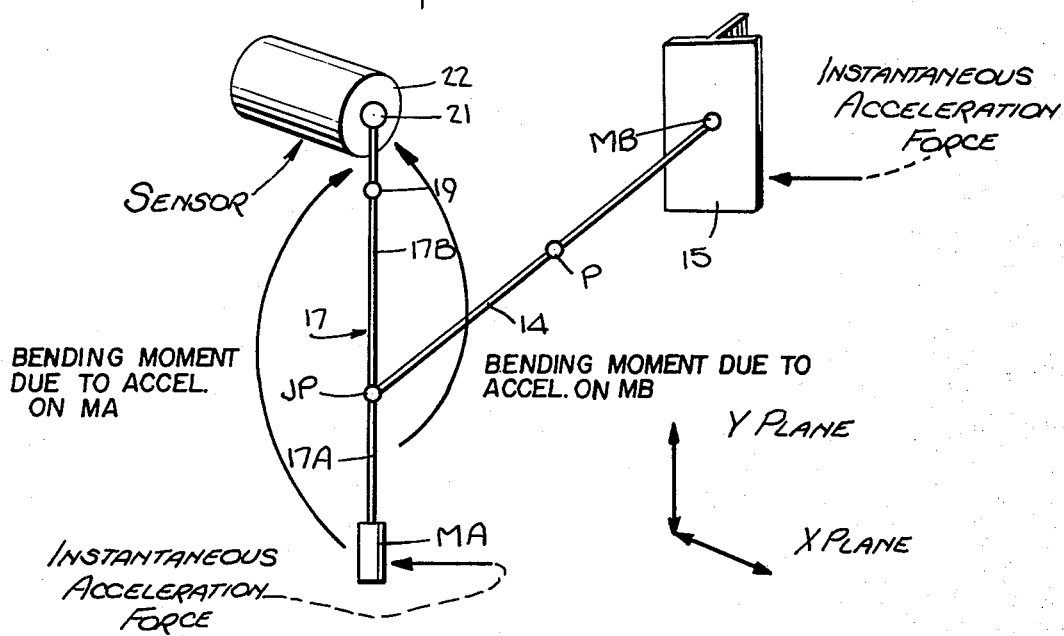
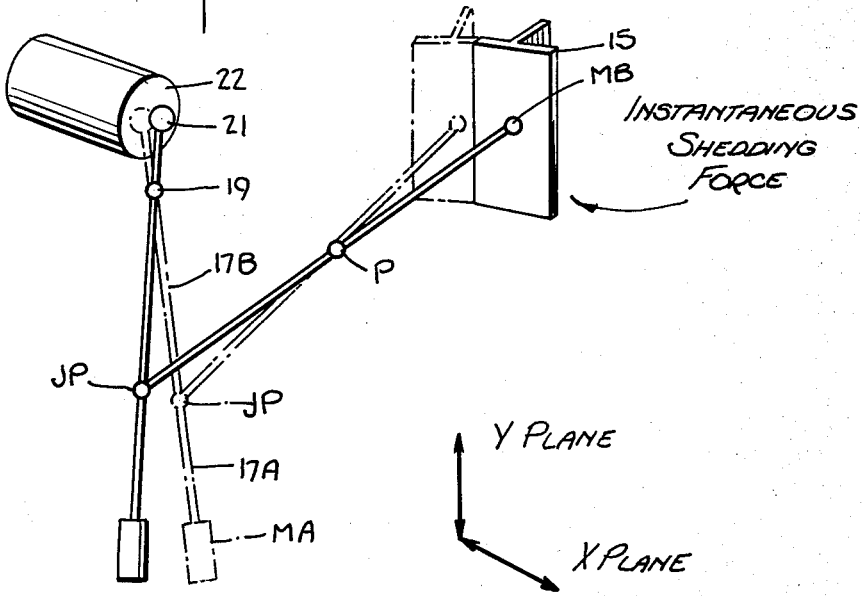

BALANCED SENSING SYSTEM FOR VORTEX-TYPE FLOWMETER

BACKGROUND OF INVENTION

This invention relates generally to flowmeters of the vortex-shedding type whose obstacle assembly includes a deflectable section excited into vibration by fluidic oscillations, and more particularly to a relatively small vortex meter of the external sensor type which is substantially insensitive to acceleration forces whereby the meter provides accurate readings regardless of shock waves or other forces other than fluidic oscillations which seek to excite the deflectable section.

In many industrial processes, one must be able to measure the volumetric flow of fluids being treated or supplied in order to carry out various control functions. It is well known that under certain circumstances the presence of an obstacle in a flow conduit will give rise to periodic fluidic vortices. For small Reynolds numbers, the downstream wake is laminar in nature, but at increasing Reynolds numbers, regular vortex patterns are formed, these being known as Karman vortex streets. The periodicity at which vortices are shed in a Karman vortex street is a function of flow rate.

In Burgess U.S. Pat. No. 3,888,120, the obstacle assembly mounted in a flow tube through which the fluid to be metered is conducted is formed by a front section fixedly mounted across the tube and a rear section cantilevered from the front section by means of a flexible beam to define a gap serving to trap the Karman vortices. Because the rear section is deflectable, it is excited into mechanical vibration by the vortices at a rate whose frequency is proportional to fluid flow.

In a 10 LV 100 model vortex meter manufactured by the Fischer & Porter Co. of Warminster, Pa. (the assignee herein) and in commercially-available meters operating on similar principles, the relatively heavy deflectable section of the obstacle assembly which is suspended from a single beam has freedom of motion in two planes. The deflectable section is free to move from side-to-side with respect to its neutral position in a lateral plane, hereinafter referred to as the X plane. It can also move up-and-down with respect to its neutral position in an axial plane, hereinafter referred to as the Y plane.

When the deflectable section moves in either the X or Y plane, bending of the beam occurs. This bending action imposes a strain on a beam-mounted sensor of the strain gauge type to generate an output signal which reflects the extent of movement and the frequency or repetition rate thereof.

In normal operation, the flow of fluid past the obstacle assembly produces vortex shedding, giving rise to fluidic forces which alternate from one side of the deflectable section to the other, thereby causing this section to vibrate in the X plane at a frequency proportional to flow rate.

When, however, the vortex meter is installed in a pipeline, it may in certain cases be subject to acceleration forces. Thus in a field installation in which the meter is included in the piping of a large industrial process system which incorporates heavy machinery or explosive activity, vibratory or shock wave forces may be transmitted by the piping to the meter. These extraneous forces are picked up by the meter and cause the beam-supported deflectable section to behave in a manner comparable to the spring-mounted inertial mass of an accelerometer to produce an output signal that is a function of acceleration forces applied in the X and Y planes.

Hence in a field installation in which the vortex meter is exposed to acceleration forces, the output signal will not accurately reflect flow rate, for this signal is a composite which includes a spurious acceleration component.

In the copending application of Herzl (common assignee) Ser. No. 668,458, filed Mar. 19, 1976, and entitled "Accleration-Proof Vortex Type Flowmeter," now U.S. Pat. No. 4,003,251 there is disclosed a meter whose structure is rendered immune to acceleration forces, the deflectable section of the obstacle assembly being cantilevered from a fixed section thereof by two spaced upper and lower beams whose physical characteristics are such as to cause this section to swing about a fulcrum.

A significant feature of the meter disclosed in the copending Herzl application is that the deflectable section of the obstacle assembly, instead of vibrating from side to side with respect to its neutral position as in a conventional meter, is effectively fulcrumed to swing back and forth on one of the beams acting as a torsion bar. The physical characteristics of the upper beam are such that this beam is weak and therefore bendable in the X plane defined by side-to-side movement of the deflectable section with respect to its neutral position and is stiff and unbendable in the Y plane defined by up and down movement, the upper beam being weak torsionally. The physical characteristics of the lower beam are such that this beam is stiff in both the Y and X planes and is weak torsionally. Thus the lower beam cannot be bent by the deflectable section but can only be twisted thereby.

The two-beam obstacle assembly structure disclosed in the copending Herzl application is best suited for inclusion in relatively large flowmeters of the vortex-shedding type, but it is not feasible to incorporate this two-beam arrangement in a small vortex flowmeter which includes an external-sensor sensing system.

An example of an external-sensor vortex meter is disclosed in the 1976 patent to Herzl, U.S. Pat. No. 3,946,608, wherein the vibrations of a deflectable section of an obstacle assembly disposed within a flow tube are mechanically transmitted to a point outside the meter by a rod extending through the beam which cantilevers the deflectable section from a front section fixedly mounted across the tube, the rod being linked to a probe at right angles to the rod which extends through the fixed section and terminates in an external coupling head. This head is engageable by a force sensor which functions to convert the coupling head vibrations into a corresponding electrical signal whose frequency is proportional to flow rate.

An external-sensor vortex meter of the type disclosed in the Herzl patent is also subject to acceleration forces which produce spurious readings, but the nature of the external-sensor sensing system incorporated in such meters and the relatively small size of such meters are such as to preclude, as a practical matter, the expedients included in the above-identified copending Herzl application to render the meter immune to acceleration forces.

SUMMARY OF INVENTION

In view of the foregoing, it is the main object of this invention to provide a vortex-type flowmeter which includes an external-sensor sensing system that is substantially immune to acceleration forces.

More particularly, it is an object of this invention to provide a relatively small vortex meter of the above-type which operates efficiently and accurately and whose external-sensor sensing system is rendered insensitive to acceleration forces by simple and inexpensive means, the deflectable section of the obstacle assembly being cantilevered from the fixed section thereof by a single flexible beam which extends along the longitudinal axis of the flow tube.

Briefly stated, these objects are attained in a vortex-type flowmeter in which an obstacle assembly mounted within a flow tube acts to generate periodic vortices, causing a deflectable tail section of the assembly to vibrate at a corresponding rate, the vibrations being sensed by an external sensor coupled by a sensing system to the deflectable tail section.

The sensing system is constituted by a rod extending through a passage in the flexible beam to transmit the tail vibrations to a bar disposed within a longitudinal bore in the fixed section and pivoted at its upper end from a diaphragm covering the bore. The rod is joined to the bar at an intermediate junction point which effectively divides the bar into an upper section that is linked to an external coupling head, and a lower section whose mass is such as to provide a balancing mass that functions to balance the system with respect to acceleration forces that tend to deflect the tail in the X and Y planes.

OUTLINE OF DRAWING

For a better understanding of the invention as well as other objects and further features thereof, reference is made to the following detailed description to be read in conjunction with the accompanying drawings, wherein:

FIG. 3 illustrates schematically the relationship of the tail section to the fluidic forces applied thereto; and FIG. 4 illustrates schematically how the sensing system is balanced in the X and Y planes.

DESCRIPTION OF INVENTION

Structure of Flowmeter

Figure 1:
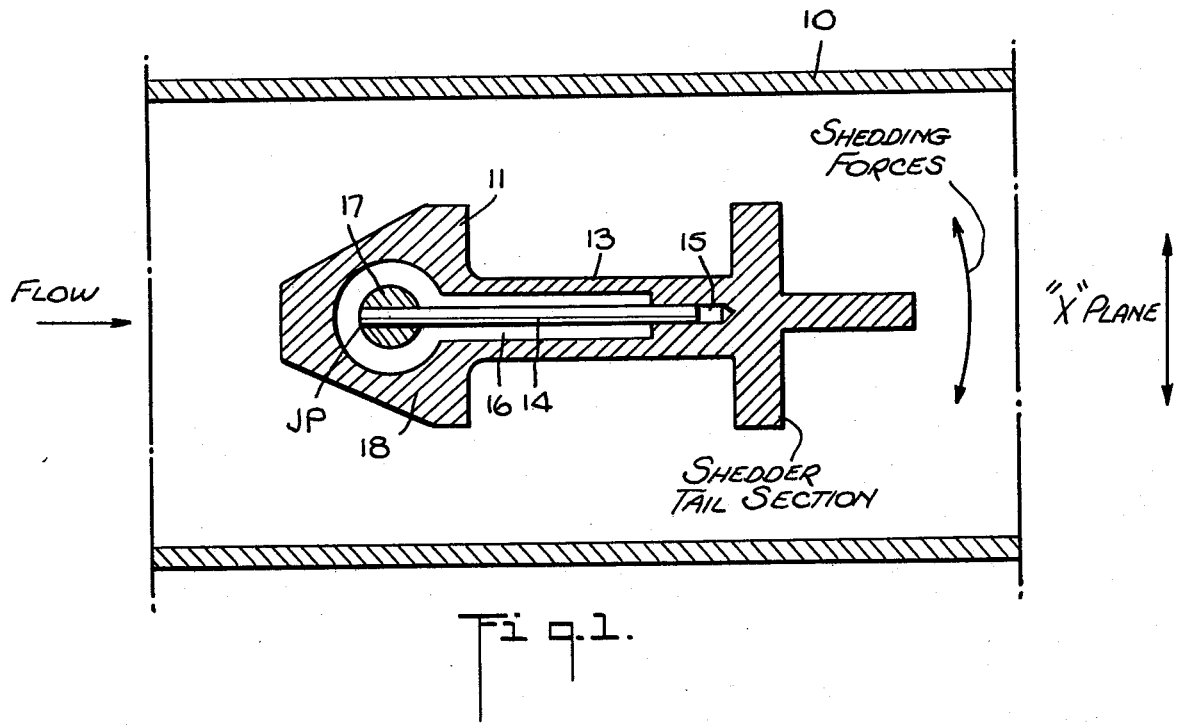
FIG. 1 is a perspective view of a vortex-type flowmeter whose obstacle assembly incorporates a preferred embodiment of an external-sensor system in accordance with the invention.
Figure 2:
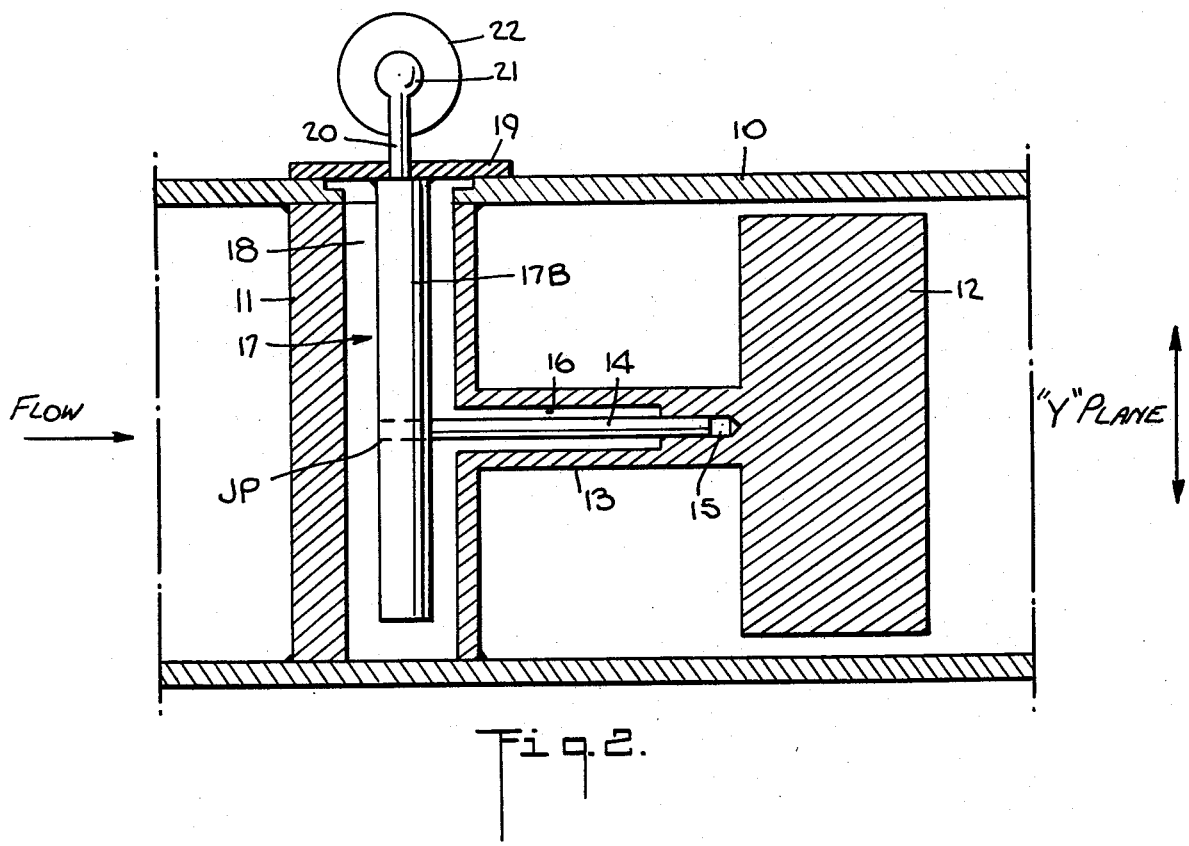
FIG. 2 is a section taken through the obstacle assembly of the flowmeter.

Referring now to the drawings and more particularly to FIGS. 1 and 2, there is shown a vortex-shedding flowmeter which incorporates an obstacle assembly in accordance with the invention, the meter including a flow tube 10 through which is conducted the fluid whose flow rate is to be measured.

This flowmeter is installed in the manner disclosed in greater detail in a copending application of Burgess Ser. No. 493,855, filed Aug. 1, 1974, by interposing it in a flow line constituted by an upstream pipe section and a down-stream pipe section. The two pipe sections have complementary mounting flanges and a circular series of bores therein to accommodate bolts.

Vertically mounted within flow tube 10 is an obstacle assembly formed by a contoured front section 11 and a tail section 12 cantilevered from the front section by a beam 13 extending along the longitudinal area of the flow tube. Front section 11 is a contoured block having a delta-shaped cross-section which is uniform throughout the longitudinal axis of the block, this axis being perpendicular to the flow axis of the flow tube. The extremities of front section 14 are attached to the wall of flow tube 10, whereby the front section is fixedly held within the flow tube, whereas the cantilevered tail section 12 of the obstacle assembly is deflectable. The tail section has a T-shaped cross-sectional form.

The apex of front section 11 faces the incoming fluid, the inclined sides thereof forming leading edges which are swept by the flow of fluid and divide the stream to create a series of vortices that alternate with respect to the center line of the front section. As the vortices detach themselves from the front section, alternate areas of low pressure are created that shift from side to side, producing an oscillating thrust behind the front section and causing the deflectable tail section 12 which is suspended by beam 13 to swing periodically at a frequency that is linearly proportional to the incoming fluid velocity.

Because tail section 12 is cantilevered by means of flexible beam 13, it is deflectable. The beam, though bendable, has sufficient rigidity so as to permit only a slight deflection of the rear section. As a consequence of the fluidic oscillations produced within the flow tube, the deflectable tail section 12 is excited into vibration at a rate corresponding to the frequency of the oscillations.

The natural resonance of the deflectable tail section is such as to be well outside the normal frequency range of the meter whereby mechanical resonance peaks are absent and the amplitude of the vibrating motion accurately reflects the amplitude of the fluidic oscillations. The downstream tail section of the assembly carries out two functions, for this section which interferes with the wake not only stabilizes it to enhance its detectability, but its vibratory motion gives rise to the ouput signal.

Because the deflectable system is relatively rigid, the total excursion of the tail section is minute even at the highest amplitudes of fluidic oscillation, so that metal fatigue of the supporting beam, as a result of the vibrating action, is minimized and failures do not arise after prolonged operation.

It is important to note that the magnitude of deflection is not of primary importance, for the flow rate information is given by the frequency, not the amplitude of vibration. Hence while the deflection magnitude is made extremely small in order to provide an acceptable fatigue life, this does not militate against a readable output of varying frequency.

The minute vibrations of the deflectable rear section of the obstacle assembly are sensed outside of flow tube 10 rather than within the tube. For this purpose, the vibrations are conveyed by an external-sensor vibration transmitting system including a rod 14, whose rear portion is socketed within a bore 15 within beam 13, the bore extending to a point adjacent deflectable tail section 12. The unsocketed portion of rod 14 lies freely within a large diameter, longitudinally-extending bore 16 communicating with the smaller diameter bore 15 and extending into front section 11.

Rod 14 is joined to a bar 17 of larger diameter at an intermediate junction point JP thereon which effectively divides the bar into a lower balancing section 17A and an upper linking section 17B. Bar 17 extends through a longitudinal bore 18 in front section 11 and projects through an opening in flow tube 10 which is covered by a flexible diaphragm 19. The upper end of bar 17 is joined to the underside of diaphragm 19 and is connected by a link 20 which projects beyond flow tube 10 to a coupling head 21. Thus the vibratory action of tail section 12 causes pivoted bar 17 to swing back and forth on diaphragm 19 to cause head 21 to vibrate accordingly.

Any force sensor 22 capable of responding to a force developed at coupling head 21 to produce a corresponding electrical signal may be used to provide a signal indicative of flow rate. A preferred sensor for this purpose is a quartz piezoelectric load cell, such as the "Piezotron" load cell (922 series) manufactured by Kistler Instrument Company of Redmond, Wash. This is a very stiff, rugged force sensor responsive to minute incremental forces and usable in environments contaminated by dust, dirt or moisture without any adverse effect on signal transmission.

The Operative Fluidic Forces

Referring now to FIG. 3, the relationship of the external-sensor vibrating transmitting system with respect to the vortices or fluidic oscillations generated within the flow tube by the obstacle assembly is schematically shown.

The vortices produced within the flow tube flows past tail section 12 and generates side-to-side forces causing this section to deflect in the X-plane. This deflection, as pointed out previously, is minute.

It will be seen that tail section 12 is connected by rod 14 to bar 17 at junction point JP, bar 17 pivoting about flexure or diaphragm 19 so that the vibrations of the tail section are transmitted to coupling head 21 which is engageable by force sensor 22 to produce a signal that reflects the flow rate. Tail section 12 effectively pivots about a pivot P on the cantilever beam on which it is suspended.

The mass distribution of bar 17 is such as to provide a balancing mass in section 17A. We shall assume that the mass of balance section 17A as well as the mass of linking section 17B are all lumped at point MA at the end of section 17A. We shall also assume that the mass of tail section is lumped at point MB.

If now the meter is subjected to an acceleration force, this acts on the lumped mass at point MB and seeks to deflect tail section 12 to one side in the X-plane, as shown in FIG. 4, in dotted lines. But because a lumped mass at point MA is also present, the same force will act on this point and seek to swing tail section 12 to the other side in the X-plane. With the proper choice of the mass at point MA, as determined by the mass distribution of bar 17 above and below junction point JP, the deflection forces will balance out and no net motion will occur in the X plane by reason of acceleration.

In order to prevent a signal output from sensor 22 as a result of acceleration, coupling head 21 must not rotate relative to point 19. At any instant in time, acceleration always acts on the lumped masses MA and MB in the same direction. Since the direction in the X plane has the greatest effect, this direction is indicated by the straight arrows in FIG. 3. The acceleration imposed on mass MA produces a clockwise bending moment in relation to point 19, as indicated by the first curved arrow, while the acceleration imposed on mass MB produces a counter-clockwise moment in relation to point 19, as indicated by the second curved arrow.

The direction of the acceleration force on mass MB can be seen in FIG. 4 where the shedding force acting in the same direction produces a counterclockwise displacement of mass MA. For balance to exist, lumped mass MA must be weighted so that its bending moment equals the bending moment produced by lumped mass MB when the identical acceleration acts on both masses.

The lumped masses at points MA and MB also tend to balance out as a result of an acceleration force which seeks to deflect tail section 12 above and below the longitudinal flow tube axis; that is, in the Y-plane. However, when the masses are such as to attain an optimum balance condition inhibiting movement in the X-plane, this condition may not yield the optimum condition for Y-plane balance.

But since the sensing system is only required to sense X plane motion during normal flowmeter operation, it can be designed to be relatively insensitive to Y plane motion, and while the balance in the Y plane is imperfect, such balance is acceptable in practice.

While there has been shown and described a preferred embodiment of a balanced sensing system for vortex-type flowmeter in accordance with the invention, it will be appreciated that many changes and modifications may be made therein without, however, departing from the essential spirit thereof.

I claim:

1. An external sensor vortex-type flowmeter which is subjected to accelration forces that produces spurious readings, said meter comprising:
   A. a flow tube through which the fluid to be metered is conducted;
   B. an obstacle assembly mounted in said tube and constituted by a front section fixedly mounted across said tube and a deflectable tail section cantilevered by a flexible beam behind the front section whereby periodic vortices generated by the front section causes the tail section to vibrate at a corresponding frequency; and
   C. a system for transmitting the vibrations of the tail section to an external coupling head engageable by a sensor to produce an electrical signal whose frequency corresponds to the vibratory frequency, said system including a rod passing through said beam and joined to a bar passing through a bore in said front section, the upper end of the bar being joined to a diaphragm covering said bore, whereby said bar is pivoted therefrom and swings back and forth in accordance with said vibrations, the upper end of said bar being linked to said coupling head, said rod being joined to said bar at an intermediate junction point dividing said bar into a lower balancing section and an upper sensor linking section, the mass distribution of said bar sections being such that when a substantially identical acceleration acts on both the balancing and tail section the resulting moments about the pivot are balanced so as to render said meter substantially insensitive to acceleration forces.

2. A flowmeter as set forth in claim 1, wherein said beam extends along the longitudinal axis of the flow tube.

3. A flowmeter as set forth in claim 1, wherein said front section has a delta-shaped cross-sectional form.

4. A flowmeter as set forth in claim 1, wherein said tail section has a T-shaped cross-sectional form.

* * * * *